United States Patent Office 3,281,500
Patented Oct. 25, 1966

3,281,500
PHOSPHOROUS-CONTAINING GRAFT COPOLYMERS EFFECTIVE AS DISPERSANTS IN OILS
La Verne N. Bauer, Cheltenham, Pa., assignor to Rohm & Haas Company, Philadelphia, Pa., a corporation of Delaware
No Drawing. Filed Nov. 22, 1961, Ser. No. 154,351
16 Claims. (Cl. 260—885)

This invention concerns a method of preparation of copolymers imparting desirable properties to oils, especially to oils used as lubricants. It also deals with the copolymers thus prepared and with lubricating compositions containing them. These copolymers are characterized by supplying dispersant and detergent actions and by imparting anti-wear properties to compositions containing them. They may also provide improvements in viscosity and viscosity index and, if desired, pour depressing action for waxy oils.

Use of polymers from polymerizable esters in lubricating compositions is common practice. Polymers from alkyl acrylates and methachylates have been prepared to supply pour depressing action and/or improved temperature - viscosity relationship. These polymers have been modified by introduction of polar groups to impart dispersing action, as by use of polymerizable nitrogenous compounds. Copolymers formed from such polymerizable esters and polymerizable phosphorus-containing esters by usual methods of polymerization, however, have not proved useful as dispersants. Some copolymers prepared from a mixture of monomers which include phosphorus-containing monomers have at times exhibited some undesirable properties such as a tendency to form gels. Although much research has been done, it has appeared from this prior work that phosphorus-containing copolymers would not be effective for imparting detergent-dispersant properties to copolymers. Yet, this present discovery demonstrates that these properties can be imparted. By the method of this invention it now becomes possible to prepare stable copolymers utilizing phosphorus-containing polymerizable esters, which polymers possess dispersing properties in oils and exhibit anti-wear properties. Along with these properties there can be developed pour depressing action and capacity for improving viscosity index of lubricants.

The method of this invention comprises first initiating free radical polymerization to a base polymer of at least one free radically polymerizable monovinylidene monomer, that is, a compound having a $CH_2{=}C{=}$ group, especially a long chained ester of acrylic, methacrylic, or itaconic acid, until about 40% to about 90% of monomer used to form base polymer has been polymerized, whereby a polymerizing mixture containing polymer is obtained, and adding to this polymerizing mixture and therewith copolymerizing an acrylic ester having a substituent containing phosphorus, said ester being supplied in an amount between about 3% and 35% of the total weight of monomers used to form final copolymer. If desired, the phosphorus-containing acrylic ester may be added in admixture with at least one other polymerizable monoethylenically unsaturated monomer.

The acrylic esters containing phosphorus are selected from at least one member of the class consisting of (I) Phosphono compounds of the formula

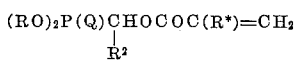

(II) Phosphato compounds of the formula $(RO)_2P(Q)OC_nH_{2n}OCOC(R^*){=}CH_2$ and (III) Phosphito compounds of the formula $(RO)_2POC_nH_{2n}OCOC(R^*){=}CH_2$ wherein R* represents hydrogen or the methyl group,
$R^2$ represents hydrogen or an alkyl group of one to seven carbon atoms,
R represents an alkyl group of one to eight carbon atoms,
n represents an integer, preferably from two to four, but may be from two to six, and
Q represents oxygen or sulfur.

It should be noted in connection with the above formulas that sulfur can be used in place of oxygen to give similar monomers. Preparation of thiolacrylates can be carried out by the method of U.S. Patent 2,977,382, wherein the compound $(RO)_2PSSNa$ is reacted with an acyl halide to give (IV) $(RO)_2P(S)SCOC(R^*){=}CH_2$, R being an alkyl group from methyl to octyl, as before, and R* hydrogen or methyl.

Preparation of phosphono, phosphato, and phosphito esters with acrylic groups is described in U.S. Patents Nos. 2,934,555, 2,993,033, and 2,934,554 respectively. The methods of U.S. No. 2,791,574 may also be utilized and as shown in this patent, halogens can be present in substituent groups. Sulfur can be introduced into compounds of these types by known ways. The thionophosphonates are derivable by the reaction, for example,

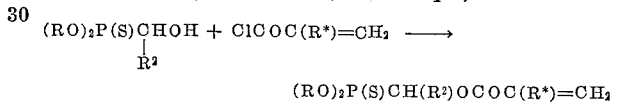

$(RO)_2P(S)CH(R^2)OCOC(R^*){=}CH_2$

Typical compounds include
(I) Dimethylphosphonomethyl acrylate or methacrylate, diethylphosphonomethyl acrylate or methacrylate, 1-diethylphosphonoethyl acrylate or methacrylate, 1-diethylphosphonopropyl acrylate or methacrylate, 1-dibutylphosphonoethyl acrylate or methacrylate, 1-di(2-ethylhexyl)phosphonoethyl acrylate or methacrylate, dioctylphosphonomethyl methacrylate, diethylthionophosphonomethyl acrylate or methacrylate, 1-diethylthiophosphonoisobutyl acrylate or methacrylate, (II) Diethylphosphatoethyl acrylate or methacrylate, dimethylphosphatoethyl acrylate or methacrylate, dibutylphosphatoethyl methacrylate, dibutylphosphatopropyl methacrylate, 2-di(2-ethylhexyl)phosphatopropyl methacrylate, 3-diethylphosphato-2-chloropropyl methacrylate, (III) Dimethylphosphitoethyl acrylate or methacrylate, diethylphosphitoethyl acrylate or methacrylate, dibutylphosphitoethyl acrylate or methacrylate, dioctylphosphitoethyl acrylate or methacrylate, diisopropylphosphitoethyl acrylate or methacrylate, 2-dimethylphosphitopropyl acrylate or methacrylate, 2-diethylphosphitobutyl acrylate or methacrylate, 3-diethylphosphitobutyl methacrylate, 4-diethylphosphitobutyl methacrylate, 5 - diethylphosphitopentyl methacrylate, 6-diethylphosphitohexyl methacrylate, (IV) S-methacryloyl diethylphosphorodithioate, S-acryloyl dimethylphosphorodithioate, and S-methacryloyl dioctylphosphorodithioate.

The first polymer or base polymer may be a homopolymer or a copolymer. The chief starting materials for forming the base polymer comprise polymerizable esters of acrylic, methacrylic, and itaconic acids or vinyl carboxylates or mixtures of such esters or mixtures of one or more such esters with one or more other polymerizable monoethylenically unsaturated compounds. Monomer or monomers for forming the base polymer need have a hydrocarbon group or groups which have sufficient size to ensure solubility of the final copolymer in the oil to be treated therewith. In addition to these long-chained starting monomers, there may be used in minor proportion one or more other types of monomers, including allyl esters of monocarboxylic acids, olefins, vinyl alkyl ethers, vinyl thioethers, vinyl lactams, vinyl oxazolidinones, vinyl pyridines, styrene and alkylstyrenes, esters of maleic or fumaric acid or maleic anhydride which by themselves do not provide base polymers of adequate molecular size or sufficient oil-solubility, but which can be used as comonomers along with more active or more oil-soluble monomers.

Probably the most important group of starting monomers comprises acrylic esters. There are readily available alkyl acrylates and methacrylates having alkyl groups from methyl through octadecyl and even larger, in particular those with 20 to 24 carbon atoms. An average size of alkyl groups is used to ensure solubility of final copolymer in the oil in which it is to be used at the desired concentration.

Typical esters which promote oil-solubility include octyl, nonyl, decyl, dodecyl, tetradecyl, hexadecyl, octadecyl, eicosyl, and tetracosyl acrylates and methacrylates. Yet esters with smaller alkyl groups may also be used in minor proportions. These include methyl, ethyl, propyl, isopropyl, butyl (in its various forms), amyl, hexyl, and heptyl acrylates and methacrylates. In the same way ester-forming groups having a cycle may find use, as in benzyl, cyclopentyl, cyclohexyl, dicyclopentyl, phenyl, or alkylphenyl acrylates or methacrylates. Any of the above alcohol residues may be used for forming esters of itaconic acid.

Similarly, in the formation of the base polymer there may be used in minor proportion at least one other polymerizable ester in which the alcohol residue (the non-hydroxyl portion of a monohydric alcohol) contains at least one hetero- atom, including chlorine, bromine, oxygen, sulfur, nitrogen, or even phosphorus. Typical groups of this sort are methoxyethyl, ethoxyethyl, butoxypropyl, butoxybutyl, phenoxyethyl, octylphenoxyethyl, butoxyethoxyethyl, butylphenoxyethyl, octylphenoxyethoxyethoxyethyl, cyclohexoxypropyl, benzoxyethyl, tetrafurfuryl, methylthiomethyl, ethylthioethyl, octylthioethyl, nonylthiopropyl, tetradecylthioethyl, dodecylthioethoxyethyl, 2-(ethylsulfinyl)ethyl, butylsulfinylethyl, dodecylsulfinylethyl, phenylsulfinylmethyl, benzylsulfinylethyl, dimethylaminoethyl, dibutylaminoethyl, tert-butylaminoethyl, tertoctylaminoethyl, dimethylaminoethoxyethyl, β-chloropropyl, β-bromoethyl, diethylphosphitoethyl, or diethylphosphonomethyl, or diethylphosphatoethyl.

In place of these acrylic esters there may be used similar esters of itaconic acids, the alcohol residues being chosen from any of those shown above.

In addition to one or more acrylic esters or itaconic esters, or in place thereof, or especially in conjunction with less readily polymerizable monomers, particularly those from maleic or fumaric acids or maleic anhydride, there may be used vinyl esters of monocarboxylic acids, especially the saturated aliphatic acids. Oil solubility is again controlled through size of the hydrocarbon portion, here of the acid residue and in general this should have an average of at least eight carbon atoms to supply this property. The carboxylate group may thus vary from that of vinyl acetate upward through vinyl stearate to larger vinyl esters. Of course, the vinyl carboxylates may be used as comonomers in conjunction with acrylic esters or itaconic esters.

Along with one or more of the starting monomers selected to provide oil-solubility for the final copolymer, there may also to used in minor proportion other polymerizable monovinylidene compounds, such as acrylic, methacrylic, or itaconic acid, maleic anhydride, half esters of maleic, fumaric, and itaconic acids and a monohydric alcohol supplying an alkyl group, for example a methyl, ethyl, butyl, octyl, isodecyl, lauryl group, a cyclohexyl group, or a benzyl group, comparable diesters of maleic or fumaric acids, half amides of the polymerizable dicarboxylic acids with an N-substituent such as an alkyl group of 1 to 12 carbon atoms, a phenyl group, a benzyl group, or a cyclohexyl group, and N-substituted acrylamides, methacrylamides and N-substituted methacrylamides, acrylonitrile, methacrylonitrile, vinyl ethers, vinyl thioethers, vinyl ketones, vinyl chloride, or vinylidence chloride.

Some typical vinyl ethers are vinyl butyl ether, vinyl octyl ether, vinyl dodecyl ether, vinyl hydroxyethyl thioether, vinyl tetradecyl thioether, vinyl phenyl ether or thioether, vinyl cyclohexyl ether, and vinyl benzyl ether. Whereas such ethers do not polymerize well by themselves by free radical initiation, they can be copolymerized with more active vinylidene compounds.

Typical substituted amides include N-methyl-, N-octyl-, N-dodecyl-, N-cyclohexyl-, N-phenyl-, N,N-dimethyl-, N,N-dibutyl-, N-methyl-N-benzyl-, and N-butoxymethyl-acrylamides, methacrylamides, and itaconamides.

These other polymerizable monomers may be admixed with the starting ester or esters or they may be mixed with the phosphorus-containing acrylic and thus supplied to the polymerizing mixture of base polymer. As has been stated, these other or auxiliary comonomers are used in minor proportion. The maximum amount will be limited by the requirement that the final copolymer be soluble in a mineral oil or a synthetic lubricant. Usually from 5% to 30% of such other monomer or monomers may be used to serve as extender or modifier. Many of these auxiliary comonomers supply new properties or variations in properties of the final copolymers.

To prepare dispersant copolymers a monomer or a plurality of monomers is treated with a free radical initiator. This may be an organic peroxide, an azo catalyst, or a hydroperoxide, the latter especially in conjunction with a quaternary ammonium compound as activator. The polymerizaiton may be effected in bulk or in an inert organic solvent in which polymer is soluble. Use of a solvent decreases the viscosity of the mixture and permits more efficient mixing.

Suitable solvents include among others aromatic hydrocarbons such as benzene, toluene, xylene, and aromatic naphthas, chlorinated hydrocarbons such as ethylene dichloride, esters such as butyl acetate or ethyl propionate, and also petroleum oils which are pure enough so as not to interfere with polymerization. Solvent may be retained with the final polymer or volatile solvents may be stripped off. When the copolymer is to be used in a lubricating oil, it is generally desirable to displace from the final polymer volatile solvent used with a good quality oil, such as 100 or 150 neutral oil, to give a solution of copolymer in oil. If the copolymer is to be used in a synthetic lubricant, the volatile solvent may be displaced with a liquid of the type to be used in the lubricant as dioctyl sebacate, dibutylphenyl phosphate, a silicate ester, or a silicone fluid.

The starting monomer or mixture of monomers is heated with initiator between about 60° and 160° C., depending in part upon choice of initiator. Polymerization may be started at one temperature and continued at other temperatures. Increments of initiator or initiator and activator may be added from time to time and different initiators may be used at different stages of polymerization. Solvent or solvents may be added or removed during the process. The entire charge of monomer to form base polymer may be present at the start or monomer may be supplied as polymerization proceeds.

As initiator, there is preferably used at least one organic hydroperoxide such as tert-butyl hydroperoxide, cumene hydroperoxide, diisopropylbenzene hydroperoxide, p-menthane hydroperoxide, pinane hydroperoxide, 2,5-dimethylhexane-2,5-dihydroperoxide and other tert-alkyl hydroperoxides, hydrocarbon substituted benzene hydroperoxides, and terpene hydroperoxides. The whole charge of hydroperoxide or hydroperoxides may be used at the start or increments may be supplied as polymerization proceeds and in the several stages of polymerization.

Hydroperoxides may be rendered active at lower temperatures by use of an activator. Especially effective activators are quaternary ammonium compounds, such as benzyltrimethylammonium chloride, dibenzyldimethylammonium bromide, butyldimethylbenzylammonium chloride, octyltrimethylammonium chloride, dodecyldimethylbenzylammonium chloride, nonylbenzyltrimethylammonium chloride, dodecylbenzyldimethylbenzylammonium chloride, didodecenyldimethylammonium chloride, benzyldimethyldodecenylammonium chloride, octylphenoxyethyldimethylbenzylammonium chloride, nonylphenoxyethoxyethyltrimethylammonium bromide, diisobutylphenoxyethoxyethyldimethylbenzylammonium chloride, cetylpyridinium chloride, N-octyl-N-methylmorpholinium chloride, and bis quaternary salts, such as those having quaternary nitrogens linked with an alkylene group, an amide-containing group, or hydrocarbon group interrupted with ether oxygen.

In place of the preferred hydroperoxide initiator system there may be used other free radical polymerization initiators. A subclass of interest comprises peroxides such as benzoyl peroxide, acetyl peroxide, caproyl peroxide, lauroyl peroxide, di-tert-butyl perphthalate, tert-butyl perbenzoate, 2,2-bis(tert-butylperoxy)butane, and methyl ethyl ketone peroxide. There may likewise be used an azo catalyst such as azodiisobutyronitrile, azobisdimethylvaleronitrile, azodiisobutyramide, dimethyl azodiisobutyrate, azobis($a$-ethylbutyronitrile), or azobis-($\alpha,\beta$-dimethylcapronitrile). In an effective variation of the method for the preparation of copolymers of this invention a peroxide or an azo catalyst is used in forming the base polymer, and a hydroperoxide, preferably in conjunction with a quaternary ammonium compound, is used in the second stage.

The amount of initiator or initiators should be between 0.01% and about 5% of the weight of comonomers. In the first stage wherein base polymer is formed, it is preferred to use about 0.05% to about 2.5% of the weight of the monomer or monomers there used, unless it is desired to produce polymer of low molecular weight, in which case up to 5% or even more may be desired. In the second stage wherein a phosphorus-containing acrylic ester is copolymerized, it is usual to supply about 0.1% to about 1% of catalyst, preferably hydroperoxide; but, as noted, sufficient catalyst or catalysts may be provided at the start to last through the process.

When an activator is used, it is proportioned in general to the amount of hydroperoxide. It will usually amount to 5% to 40% of the weight of the hydroperoxide.

When in the first stage the monomer or monomers have been polymerized to an extent of at least about 40% (by weight), addition of polymerizable phosphorus-containing acrylic ester is made. Addition may be made in one lot or in increments. At this stage, additional polymerization initiator may be supplied to develop final copolymers with optimum dispersing activities.

Evaluation tests with copolymers prepared by addition of phosphorus-containing acrylic esters to initial base polymer mixtures containing over 90% of base polymer showed that the resulting final copolymers were not so effective as when such addition was made to mixtures containing somewhat lower amounts of base polymer. It was found, however, that monomer could be added to base polymer, the formation of which had been carried too far, so as to bring the proportion of base polymer within the effective limits.

Monomer can be added to base polymer directly or it can be added in admixture with the phosphorus-containing acrylic ester.

Extent of initial polymerization may conveniently be determined by such a simple method as volatilization of monomer and solvent and estimation of residue. Extent of polymerization may also be determined by precipitation in a liquid which is a non-solvent for the polymer. Estimation of extent of formation of base polymer under a given set of condition permits establishing a standard procedure as to proportions of initiator, concentrations, temperatures, and times to ensure regularly obtaining dispersant copolymers with well developed dispersing action.

After final copolymer has been formed subsequent to adding one or more polymerizable phosphorus-containing acrylic esters to the base polymer and monomer or monomers, the final copolymer may be isolated, if so desired, by stripping off volatile material, including solvent and residual monomer, by heating, best under reduced pressure, or by precipitating final copolymer with an organic solvent which is a non-solvent for the copolymer.

It is usually more expedient to take up final copolymer in a liquid such as a petroleum oil or a synthetic lubricant and prepare a concentrate containing 20% to 50% of copolymer. Volatile solvent and/or monomer may be volatilized from the mixture of copolymer and oil or synthetic lubricant. The concentrate is convenient for handling, stripping, and blending.

If copolymer is prepared in a volatile solvent, it is readily transferred to an oil or a relatively non-volatile ester by mixing the solution of copolymer in volatile solvent and oil or ester and distilling the volatile material from the mixture. The mixture may be heated between 100° and 160° C., desirably under reduced pressure, conveniently at 5 to 30 mm. (Hg) pressure, to ensure complete removal of volatiles. During the heating of the mixture, any remaining traces of initiator are decomposed.

Copolymers may be prepared over a wide range of molecular weights by known variations in such factors as monomers, solvent concentrations, temperature, time, and catalysts and their proportions. Molecular weights determined by viscosity methods have been varied from about 20,000 to over 2,000,000. Low molecular weights are especially desirable when polymers are to be rather resistant to shear. High molecular weights are desirable when maximum thickening and optimum properties are required.

*Example 1*

There were mixed 40.6 parts of 98.6% pure laurylmyristyl methacrylate, 2.5 parts of toluene, and 0.2 part of a 50% diisopropylbenzene hydroperoxide solution in alcohol and acetone. About 30% of the mixture was added to a polymerization vessel which was flushed with nitrogen and heated with an oil bath to 105° C. Time was recorded from the moment that this temperature was reached. Addition was made of 0.04 part of a butanol solution containing 25% of diisobutylphenoxyethoxyethyldimethylbenzylammonium chloride. The rest of the above mixture was run into the vessel over the next 100 minutes with the batch temperature at 111°–116° C. It was found that about 50% of the monomer had formed polymer. There was then added over a 15-minute period a mixture of 10 parts of diethylphosphatoethyl methacrylate, 0.05 part of 50% diisopropylbenzene hydroperoxide solution, and 0.05 part of 5% solution of the above quaternary chloride in butanol. Heating and stirring were continued. At intervals there were added additional amounts of initiator and activator totaling 0.07 part of the hydroperoxide and 0.007 part of the quaternary chloride. Addition of 2.5 parts of toluene was also made. Heating was discontinued after 6.5 hours, but stirring was continued for another half hour. There resulted a solution of 41% copolymer, corresponding to a yield of 87.7%. A toluene solution adjusted to 30% of copolymer had a viscosity of 8247 centistokes at 100° F.

Copolymer was transformed to oil by mixing 43.1 parts of the toluene solution with 30 parts of 100 SUS oil and heating the mixture with stirring under reduced pressure, the mixture being heated to 100° C./10 mm. for 90 minutes.

This oil solution exhibited dispersing action against asphaltenes at 150° as well as 90° C., 0.25% dispersing 0.4% of asphaltenes at 150° C.

*Example 2*

The above procedure was followed starting with 90 parts of cetyl-stearyl acrylate, 0.16 part of diisopropylbenzene hydroperoxide in solution and 0.02 part of octylphenoxyethyldimethylbenzylammonium chloride. After base polymer had been formed therefrom for two hours (about 60% conversion), there was slowly added a mixture of 10 parts of diethylphosphatoethyl acrylate, 0.05 part of 5% octylphenoxyethyldimethylbenzylammonium chloride solution and 0.05 part of 50% diisopropylbenzene hydroperoxide solution. Additions were made of initiator and activator as copolymerization proceeded over 7 hours. The final solution contained 47% of copolymer, a yield of 93%. A sample adjusted to 30% with toluene gave a viscosity of 255 cs. at 100° F. This copolymer was a dispersant for asphaltenes in oil, 0.5% thereof dispersing 0.2% of asphaltenes at 150° C.

*Example 3*

The procedure of the above examples was followed by starting with 95 parts of dodecyl methacrylate and adding 5 parts of diethylphosphatoethyl methacrylate beginning after the second hour of polymerization. There were used totals of 0.43 part of diisopropylbenzene hydroperoxide and 0.043 part of diisobutylphenoxyethoxyethyldimethylbenzylammonium chloride. The final solution contained 45.4% of copolymer in a yield of 85.5%. A 30% solution of copolymer in toluene had a viscosity of 136.8 cs. at 100° F. This copolymer dispersed asphaltenes in oil, 0.5% of copolymer dispersing 0.2% of asphaltenes at 90° C.

*Example 4*

The same procedure was followed starting with 88 parts of lauryl-myristyl methacrylate and adding 12 parts of diethylphosphitoethyl methacrylate. There was used a total of 0.45 part of diisopropylbenzene hydroperoxide and 0.045 part of diisobutylphenoxyethoxyethyldimethylbenzylammonium chloride. The product was a 37% solution of copolymer in an 81% yield. A sample adjusted to 30% of copolymer in toluene had a viscosity of 57.6 cs. at 100° F. The copolymer exhibited dispersing action, 0.5% of copolymer dispersing 0.2% of asphaltenes at 90° C.

*Example 5*

The same procedure was applied to 90 parts of lauryl-myristyl methacrylate and 10 parts of diethylphosphonoethyl methacrylate with use of 0.36 part of diisopropylbenzene hydroperoxide and 0.026 part of diisobutylphenoxyethoxyethyldimethylbenzylammonium chloride. The product was a toluene solution of 34.2% of copolymer in a yield of 71.3%. A 30% solution of copolymer in toluene had a viscosity of 478 cs. at 100° F. The copolymer dispersed asphaltenes in oil, 0.25% of copolymer dispersing 0.2% of asphaltenes at 90° C.

*Example 6*

By the same procedural steps and conditions used above, there was first polymerized a mixture of 40 parts of lauryl-myristyl methacrylate and 40 parts of n-butyl methacrylate in 30 parts of dioctyl sebacate with 0.25 part of cumene hydroperoxide and 0.025 part of dodecyldimethylbenzylammonium chloride. After this mixture was polymerized for 2¼ hours, there was slowly added thereto 20 parts of diethylphosphatoethyl acrylate. Additions were made of initiator and activator to bring the totals to 0.47 and 0.047 respectively. From time to time additional dioctyl sebacate was added to a total of 60 parts. The product was a slightly hazy solution containing 50% of copolymer in a yield of 90%.

The above procedure was repeated with use of 40 parts of lauryl-myristyl methacrylate, 30 parts of n-butyl methacrylate, and 30 parts of diethylphosphatoethyl methacrylate. There was likewise a 90% yield of copolymer in 50% solution.

Both of these copolymers exhibited dispersing action against asphaltenes.

*Example 7*

Polymerization apparatus comprised a vessel equipped with stirrer, thermometer, condenser, inlet tube, and an addition funnel and surrounded by an oil bath. The vessel was swept with nitrogen and the oil bath was heated to 118° C. There were mixed 140 parts of lauryl-myristyl methacrylate, 20 parts of 2-(ethylsulfinyl)ethyl methacrylate, 20 parts of toluene, 0.8 part of diisopropylbenzene hydroperoxide in a 50% solution, and 0.08 part of diisobutyl(methyl)phenoxyethoxyethyldimethylbenzylammonium chloride in a 5% solution in butanol. This mixture was gradually run into the polymerization apparatus with the temperature maintained at 116°–118° C. After 2.67 hours, additions were made of 0.02 part of diisopropylbenzene hydroperoxide and 0.02 part of the same quaternary salt. At 3 hours, addition (after about 80% polymerization) was begun of a mixture of 20 parts of lauryl-myristyl methacrylate, 20 parts of diethylphosphatoethyl methacrylate, 0.2 part of the same peroxide, 0.2 part of the same quaternary salt, and 10 parts of toluene. Subsequent additions of toluene were made to maintain good stirring. At 7 hours heating was discontinued. The product was a 48.4% solution of copolymer, representing a yield of 75%.

This copolymer was a dispersant as shown by the standard asphaltenes dispersancy test at 150° C., 0.25% readily dispersing 0.4% of asphaltenes in a lubricating oil.

*Example 8*

The above procedure was followed, starting with a mixture of 150 parts of lauryl-myristyl methacrylate, 20 parts of 2-(ethylsulfinyl)ethyl methacrylate, 20 parts of toluene, 0.4 part of diisopropylbenzene hydroperoxide and 0.04 part of diisobutylphenoxyethoxyethyldimethylbenbzylammonium chloride, initiator and activator being used in solutions. Polymerization was started at 120° C. and continued at 113°–120° C. After two hours, additions were made of 0.01 part of initiator and 0.002 part of activator, and then 30 parts of diethylphosphonoethyl methacrylate and 20 parts of toluene. Thereafter, temperature was held at 110°–113° C. for 7 hours. From time to time additions of initiator, activator and toluene were made to totals of 0.5 part of initiator and 0.05 part of activator, and 200 parts of toluene. There was obtained a 38.9% solution of copolymer, a yield of 79%. A 0.25% blend of this copolymer in oil dispersed 0.47% of asphaltenes in an oil blend at 150° C.

*Example 9*

By the method of Example 8 there was first polymerized 80 parts of lauryl-myristyl methacrylate in 10 parts of toluene to about 80% with 0.4 part of tert-butyl hydroperoxide from a toluene solution. The bath temperature was maintained at 120°–124° C. After 2½ hours addition was slowly made of 20 parts of diethylphosphonothionoethyl methacrylate in toluene. Additions were made of tert-butyl hydroperoxide in toluene for a total of 0.2 part. The product was a 41.4% solution of copolymer representing a yield of 86%.

For purposes of comparison the same amounts of monomers as used just above were used at the start and the mixture polymerized under the same conditions. A solution of 40% of a copolymer was obtained. It was not, however, a dispersant for asphaltenes in oils.

The above procedure was repeated with substitution of diethylphosphatothionethyl methacrylate for the above phosphonothiono compound. A copolymer was likewise obtained which was an effective dispersant, 0.5% dispersing 0.47% of asphaltenes in oil at 150° C.

Copolymers were prepared from long-chained alkyl methacrylates or acrylates and various dialkylphosphonoalkyl, dialkylphosphatoalkyl, and dialkylphosphitoalkyl methacrylates and acrylates which were added to base polymer by the method illustrated above with choice of various free radical catalysts, including tert-butyl perbenzoate, tert-butyl hydroperoxide, cumene hydroperoxide, azodiisobutyronitrile, and diisopropylbenzene hydroperoxide in conjunction with a variety of quaternary ammonium salts. Yields of 85 to 95% of copolymer were readily attained and the copolymers exhibited marked dispersing action.

A proportion up to 35% of diethylphosphonoethyl acrylate or methacrylate gave copolymers which were soluble even at 5% in heavy lubricating oils, whereas higher proportions caused copolymer to separate when the blend containing copolymer was stored in a refrigerator.

*Example 10*

There were mixed 15.3 parts of cetyl-stearyl methacrylate, 14.2 parts of lauryl-myristyl methacrylate, 6.1 parts of n-butyl methacrylate, 2.5 parts of toluene, and 0.05 part of diisopropylbenzene hydroperoxide. About a third of this mixture was run into a polymerization vessel heated at 125° C. and blanketed with nitrogen. Thereupon there was added a solution supplying 0.01 part of didodecenyldimethylammonium chloride. Polymerization was continued at 120°–130° C. with addition of the rest of the mixture. After about two hours an aliquot was taken and polymer therein determined. It corresponded to 75% of the initial monomers. There was then added a mixture of 7.5 parts of dimethylphosphonomethyl methacrylate, 7.5 parts of dodecyl acrylate, 0.02 part of diisopropylbenzene hydroperoxide in a 50% solution, and 0.002 part of the same quarternary ammonium salt, likewise in solution. Polymerization was continued at 117°–105° C. for 6.5 hours. The final product was a 39% solution of copolymer.

The copolymer was transferred to a mineral oil by mixing the above solution and oil and heating and stirring the mixture at 105° C./10 mm. for 90 minutes.

In an oil blend 0.25% of this copolymer dispersed 0.4% of asphaltenes at 150° C.

*Example 11*

The previous procedure was repeated with substitution of 9 parts of di-n-butylphosphonomethyl methacrylate for the 7.5 parts of dimethylphosphonomethyl methacrylate. The final product was a 41% solution of copolymer which likewise exhibited dispersing action in the standard asphaltenes tests at 150° and 90° C.

The procedure was again followed with substitution of di-n-butylphosphono-2-ethylhexyl methacrylate with an entirely comparable result.

The procedure was again followed with substitution of di - 2 - ethylhexylphosphono-2-ethylhexyl methacrylate, again with a similar outcome.

*Example 12*

A 500 cc. round-bottom, 3-neck flask was equipped with a gas inlet tube, a condenser, a circular-type glass stirrer, and an addition funnel. The system was flushed with nitrogen and the bath surrounding the reaction vessel was maintained at an initial temperature of 107° C. A monomer mixture was prepared from 22.5 parts of lauryl-myristyl methacrylate, 3.0 parts of dilauryl-myristyl fumarate, 1.5 parts of toluene, 0.6 part of diisopropylbenzene hydroperoxide solution (50% active ingredient), and 0.6 part of diisobutylphenoxyethoxyethylbenzyldimethylammonium chloride solution (5% active ingredient). With the bath temperature at 107° C. the monomer mixture was added to the reaction flask. After a heating period of 2.0 hours a second monomer mixture composed of 4.5 parts of diethylphosphonoethyl methacrylate, 1.5 parts of toluene, 0.1 part of a diisopropylbenzene hydroperoxide solution (50% active ingredient), and 0.1 part of a diisobutylphenoxyethoxyethylbenzyldimethylammonium chloride solution (5% active ingredient) was added to the reaction mixture. Five additions, each of 0.1 part of a diisopropylbenzene hydroperoxide solution (50% active ingredient) and 0.1 part of a diisobutylphenoxyethoxyethylbenzyldimethylammonium chloride (50% active ingredient) in from 0.5 part to 5 parts of toluene were made at 2.67, 3.33, 4.00, 4.67 and 5.33 hours. At 6.00 hours, 27 parts of toluene was added. The temperature was maintained at 103–112° C. throughout the polymerization until 6.50 hours when heating was discontinued. The product was a 40.6% solution of copolymer in toluene and exhibited a viscosity of 600.3 centistokes at 100° F. An oil blend containing 0.125% of this copolymer dispersed 0.4% asphaltenes at 150° C.

*Example 13*

In the same manner as described in Example 12 there were copolymerized 22.5 parts of lauryl-myristyl methacrylate, 4.5 parts of diethylphosphonoethyl methacrylate and 3.0 parts of dilauryl-myristyl fumarate in 42.0 parts of toluene with 1.2 parts of diisopropylbenzene hydroperoxide solution (50% active ingredient) and 1.2 parts of a diisobutylphenoxyethoxyethylbenzyldimethylammonium chloride solution (5% active ingredient) during 6.5 hours to give a 40.1% solution of copolymer in toluene. An oil blend containing 0.25% of this copolymer dispersed 0.4% of asphaltenes at 150° C.

*Example 14*

In the same manner as described in Example 12 there were copolymerized 22.5 parts of lauryl-myristyl methacrylate, 4.5 parts of diethylphosphonoethyl methacrylate and 3.0 parts of dioctyl maleate in 8 parts of toluene with 1.5 parts of a diisopropylbenzene hydroperoxide solution (50% active ingredient) and 1.5 parts of diisobutylphenoxyethoxyethylbenzyldimethylammonium chloride solution (5% active ingredient) during 6.5 hours to give a 37.3% solution of copolymer in toluene. A blend of 0.125% of this copolymer in oil dispersed 0.4% asphaltenes at 150° C.

*Example 15*

In the same manner as described in Example 12 there were copolymerized 22.5 parts of lauryl-myristyl methacrylate, 4.5 parts of diethlyphosphonoethyl methacrylate and 3.0 parts of vinyl acetate in 44.0 parts of toluene with 0.6 part of a diisopropylbenzene hydroperoxide solution (50% active ingredient) and 0.6 part of a diisobutylphenoxyethoxyethylbenzyldimethylammonium chloride solution (5% active ingredient) during 6.5 hours to give a 34.6% solution of copolymer in toluene which had a viscosity of 154.0 centistokes at 100° F. A blend of 0.25% of this copolymer in oil dispersed 0.4% asphaltenes at 150° C.

*Example 16*

In the same manner as described in Example 12 there were copolymerized 22.5 parts of lauryl-myristyl methacrylate, 4.5 parts of diethylphosphonoethyl methacrylate, and 3.0 parts of styrene in 45 parts of toluene with 0.6 part of a diisopropylbenzene hydroperoxide solution (50% active ingredient) and 0.6 part of a diisobutylphenoxyethoxyethylbenzyldimethylammonium chloride solution (5% active ingredient) during 6.5 hours to give a 42.3% solution of copolymer in toluene which exhibited a viscosity of 721.6 cs. at 100° F. A blend of 0.25% of this copolymer in oil dispersed 0.4% asphaltenes at 150° C.

*Example 17*

A 500 cc. round-bottom, 3-neck flask was equipped with a gas inlet tube, a condenser, a circular-type glass stirrer, and an addition funnel. The system was flushed with nitrogen, and the bath surrounding the reaction vessel was maintained at an initial temperature of 110° C. A monomer mixture was prepared from 22.5 parts of lauryl-myristyl methacrylate, 3.0 parts of methoxyethoxyethyl vinyl ether, 1.5 parts of toluene, and 0.12 part of dimethyl azodiisobutyrate. With the bath temperature at 110° C. the monomer mixture was added to the reaction flask with formation of base polymer in solution. After a heating period of 2.0 hours a second monomer mixture composed of 4.5 parts of diethylphosphonoethyl methacrylate, 1.5 parts of toluene and 0.04 part of dimethyl azodiisobutyrate was added to the solution containing about 70% of base polymer. Five additions each of 0.04 part of dimethylazodiisobutyrate in 1.0 part of toluene were made at 2.67, 3.33, 4.00, 4.67, and 5.33 hours. The temperature was maintained at 102–112° C. throughout the polymerization until 6.5 hours when heating was discontinued. The product was a 37.1% solution of copolymer in toluene and exhibited a viscosity of 235.9 cs. at 100° F. A blend of 0.125% of this copolymer in oil dispersed 0.4% asphaltenes at 150° C.

*Example 18*

In the same manner as described in Example 17, there were copolymerized 22.5 parts of lauryl-myristyl methacrylate, 4.5 parts of diethylphosphonoethyl methacrylate, and 3.0 parts of isooctyl methacrylate in 46 parts of toluene with 0.54 part of a diisopropylbenzene hydroperoxide solution (50% active ingredient) and 0.54 part of a diisobutylphenoxyethoxyethylbenzyldimethylammonium chloride solution (5% active ingredient) during 6.5 hours to give a 36.8% solution of copolymer in toluene which exhibited a viscosity of 215.4 cs. at 100° F. An oil blend of 0.5% of this copolymer dispersed 0.4% asphaltenes at 150° C.

*Example 19*

In the same manner as described in Example 17, there were copolymerized 22.5 parts of lauryl-myristyl methacrylate, 4.5 parts of diethylphosphonoethyl methacrylate, and 3.0 parts of methyl methacrylate in 46.0 parts of toluene with 0.54 part of a diisopropylbenzene hydroperoxide solution (50% active ingredient) and 0.54 part of a diisobutylphenoxyethoxyethylbenzyldimethylammonium chloride solution (5% active ingredient) during 6.5 hours to give a 39.5% solution of copolymer in toluene. One percent of this copolymer in an oil test blend dispersed 0.4% asphaltenes at 150° C.

*Example 20*

Polymerization apparatus described in Example 17 was used. The system was flushed with nitrogen and the bath surrounding the reaction vessel was maintained at an initial temperature of 117° C. A monomer mixture was prepared from 22.5 parts of lauryl-myristyl methacrylate, 3.0 parts of dimethylaminoethyl methacrylate, 1.5 parts of toluene, 0.3 part of a diisopropylbenzene hydroperoxide solution (50% active ingredient) and 0.3 part of a diisobutylphenoxyethoxyethylbenzyldimethylammonium chloride solution (5% active ingredient). With the bath temperature at 117° C. the monomer mixture was added to the reaction flask. After a heating period of 2.0 hours during which time about 60% of the monomer had polymerized, a second monomer mixture composed of 4.5 parts of diethylphosphonoethyl methacrylate, 1.5 parts of toluene, 0.04 part of a diisopropylbenzene hydroperoxide solution (50% active ingredient) and 0.04 part of a diisobutylphenoxyethoxyethylbenzyldimethylammonium chloride solution (5% active ingredient) was added to the reaction mixture. Five additions, each of 0.04 part of a diisopropylbenzene hydroperoxide solution (50% active ingredient) and 0.04 part of a diisobutylphenoxyethoxyethylbenzyldimethylammonium chloride solution (5% active ingredient) in 5 parts of toluene were made at 2.67, 3.33, 4.00, 4.67 and 5.33 hours. At 6.0 hours, 18 parts of toluene was added. The temperature was maintained at 103–117° C. throughout the polymerization until 6.5 hours when heating was discontinued. The product was a 36.1% solution of copolymer in toluene. An oil blend of 0.25% of this copolymer dispersed 0.4% asphaltenes at 150° C.

*Example 21*

In the same manner as described in Example 20 there were copolymerized 22.5 parts of lauryl-myristyl methacrylate, 4.5 parts of diethylphosphonoethyl methacrylate, and 3.0 parts of tert-butylaminoethyl methacrylate in 43.0 parts of toluene with 0.54 part of a diisopropylbenzene hydroperoxide solution (50% active ingredient) and 0.54 part of a diisobutylphenoxyethoxyethylbenzyldimethylammonium chloride solution (5% active ingredient) during 6.5 hours to give a 37.2% solution of copolymer in toluene which exhibited a viscosity of 412.1 cs. at 100° F. An oil blend of 0.5% of this copolymer dispersed 0.4% asphaltenes at 150° C.

*Example 22*

In the same manner as described in Example 20 there were copolymerized 22.5 parts of lauryl-myristyl methacrylate, 4.5 parts of diethylphosphonoethyl methacrylate, and 3.0 parts of N-vinyl-2-pyrrolidinone in 66 parts of toluene with 0.54 part of a diisopropylbenzene hydroperoxide solution (50% active ingredient) and 0.54 part of a diisobutylphenoxyethoxyethylbenzyldimethylammonium chloride solution (5% active ingredient) during 6.5 hours to give a 29.1% solution of copolymer in toluene which exhibited a viscosity of 1427.2 cs. at 100° F. A blend of 0.25% of this copolymer in oil dispersed 0.4% asphaltenes at 140° C.

*Example 23*

In the same manner as described in Example 20 there were copolymerized 22.5 parts of lauryl-myristyl methacrylate, 4.5 parts of diethylphosphonoethyl methacrylate, and 3.0 parts of 2-methyl-5-vinyl pyridine in 56.0 parts of toluene with 0.54 part of a diisopropylbenzene hydroperoxide solution (50% active ingredient), an 0.54 part of a diisobutylphenoxyethoxyethylbenzyldimethylammonium chloride solution (5% active ingredient) during 6.5 hours to give a 32.9% solution of copolymer in toluene. A solution of 0.25% of this copolymer in oil dispersed 0.4% asphaltenes at 150° C.

*Example 24*

A polymerization system like that used above was flushed with nitrogen and the bath surrounding the reaction vessel was maintained at an initial temperature of 113° C. A monomer mixture was prepared from 16.5 parts of lauryl acrylate, 9.0 parts of methyl acrylate, 1.5 parts of toluene, 0.12 part of a diisopropylbenzene hydroperoxide solution (50% active ingredient) and 0.12 part of a diisobutylphenoxyethoxyethylbenzyldimethylammonium chloride solution (5% active ingredient). With the bath temperature at 113° C. the monomer mixture was added to the reaction flask. At 0.42 hours 30 parts of toluene was added. After a heating period of 2.0 hours when about 65% of polymer had formed, a second monomer mixture composed of 4.5 parts of diethylphosphonoethyl methacrylate, 6.5 parts of toluene, 0.02 part of a diisopropylbenzene hydroperoxide solution (50% active ingredient), and 0.02 part of a diisobutylphenoxyethoxyethylbenzyldimethylammonium chloride solution (5% active ingredient) was added to the reaction mixture. Five additions each of 0.02 part of a diisopropylbenzene hydroperoxide solution (50% active ingredient) and 0.02 part of a diisobutylphenoxyethoxyethylbenzyldimethylammonium chloride solution (5% active ingredient) in 5.0 parts of toluene were made at 2.67, 3.33, 4.00, 4.67, and 5.33 hours. At 6.0 hours 25 parts of toluene was added. The temperature was maintained at 107–115° C. throughout the polymerization until 6.5 hours when heating was discontinued. The product was a 21.9% solution of copolymer in toluene and exhibited a viscosity of 445.2 cs. at 100° F. One percent of this copolymer in an oil test blend dispersed 0.4% asphaltenes at 150° C.

*Example 25*

A 500 cc. round-bottom, 3-neck flask was equipped with a gas inlet tube, a condenser, a circular-type glass stirrer and an addition funnel. The system was flushed with nitrogen and the bath surrounding the reaction vessel was maintained at an initial temperature of 114° C. A monomer mixture was prepared from 45.0 parts of lauryl-myristyl methacrylate, 3.0 parts of toluene, 0.24 part of a diisopropylbenzene hydroperoxide solution (50% active ingredient) and 0.24 part of a diisobutyl-phenoxyethoxyethylbenzyldimethylammonium chloride solution (5% active ingredient). With the bath temperature at 114° C. the monomer mixture was added to the reaction flask. After a heating period of 2.0 hours when about 55% of base polymer had formed, a second monomer mixture composed of 15.0 parts diethylphosphonethyl methacrylate, 11.5 parts of toluene, 0.06 part of a diisopropylbenzene hydroperoxide solution (50% active ingredient), and 0.06 part of a diisobutylphenoxyethoxyethylbenzyldimethylammonium chloride solution (5% active ingredient) was added to the base polymer. Five additions each of 0.06 part of a diisopropylbenzene hydroperoxide solution (50% active ingredient), 0.06 part of a diisobutylphenoxyethoxyethylbenzyldimethylammonium chloride solution (5% active ingredient) in 5 parts of toluene were made at 2.67, 3.33, 4.00, 4.67, and 5.33 hours. At 6.0 hours, 25 parts of toluene were added. The temperature was maintained at 110°–114° C. throughout the polymerization until 6.5 hours when heating was discontinued. The product was a 40.4% solution of copolymer in toluene. A blend of 0.125% of this copolymer in oil dispersed 0.4% asphaltenes at 150° C.

This copolymer was an effective viscosity index improver as shown by the following data obtained in di-2-ethylhexyl sebacate containing approximately 0.02 percent free sebacic acid.

| Weight Percent | | Viscosity, centistokes | | V.I. |
| --- | --- | --- | --- | --- |
| Polymer | Bulk | 210° F. | 100° F. | |
| 0.0 | 0.0 | 3.32 | 12.60 | 154 |
| 1.0 | 4.0 | 4.37 | 15.94 | 200 |
| 2.5 | 10.0 | 6.00 | 22.58 | 183 |

*Example 26*

A polymerization system as described above was flushed with nitrogen and the bath surrounding the reaction vessel was maintained at an initial temperature of 119° C. A monomer mixture was prepared from 75.0 parts of lauryl-myristyl methacrylate, 5.0 parts of oil, 0.4 part of a diisopropylbenzene hydroperoxide solution (50% active ingredient), and 0.4 part of a diisobutylphenoxyethoxyethylbenzyldimethylammonium chloride solution (5% active ingredient). With the bath temperature at 119° C., 30% of the monomer mixture was added to the flask. After a heating period of 0.33 hour, the remainder of the monomer mixture was added uniformly over 1.33 hours. After a total heating period of 2.0 hours a second monomer mixture composed of 25.0 parts of diethylphosphonoethyl methacrylate, 5.0 parts of oil, 0.2 part of a diisopropylbenzene hydroperoxide solution (50% active ingredient), 0.2 part of a diisobutylphenoxyethoxyethylbenzyldimethylammonium chloride solution (5% active ingredient) was added to the reaction mixture all at once. Five additions each of 0.04 part of a diisopropylbenzene hydroperoxide solution (50% active ingredient), 0.04 part of a diisobutylphenoxyethoxyethylbenzyldimethylammonium chloride solution (5% active ingredient) in 10.0 parts of oil were made at 2.67, 3.33, 4.00, 4.67, and 5.33 hours. At 6.0 hours 50 parts of oil were added. The bath temperature was maintained at 119°–125° C. throughout the polymerization until 6.5 hours when heating was discontinued. The product was a 46.4% solution of copolymer in oil. One percent of this copolymer in an oil test blend dispersed 0.4% asphaltenes at 150° C.

*Example 27*

By the same general procedure as described in Example 25, there were copolymerized 75.0 parts of lauryl-myristyl methacrylate and 25.0 parts of diethylphosphonoethyl methacrylate in 45.0 parts of toluene with 0.8 parts of a diisopropylbenzene hydroperoxide solution (50% active ingredient) and 0.8 part of a diisobutylphenoxyethoxyethylbenzyldimethylammonium chloride solution (5% active ingredient) during 6.5 hours with the bath temperature at 160°–163° C. to give a 58.2% solution of copolymer in toluene. A solution of 0.25% of this copolymer in an oil test blend dispersed 0.4% asphaltenes at 150° C.

*Example 28*

By the same general procedure described in Example 25, there were copolymerized 75.0 parts of lauryl-myristyl methacrylate and 25.0 parts of diethylphosphonethyl methacrylate in 160.0 parts of toluene with 0.4 part of a diisopropylbenzene hydroperoxide solution (50% active ingredient) and 0.4 part of a diisobutylphenoxyethoxyethylbenzyldimethylammonium chloride solution (5% active ingredient) during 6.5 hours with the bath temperature at 121–125° C. to give a 36.6% solution of copolymer in toluene. One percent of this copolymer in an oil test blend dispersed 0.4% asphaltenes at 150° C.

*Example 29*

By the same general procedure as described above in Example 26 there were copolymerized 75.0 parts of lauryl-myristyl methacrylate and 25.0 parts of diethylphosphonoethyl methacrylate in 40.0 parts of toluene with 12.0 parts of a diisopropylbenzene hydroperoxide solution (50% active ingredient) and 12.0 parts of a diisobutylphenoxyethoxyethylbenzyldimethylammonium chloride solution (5% active ingredient) during 6.5 hours with the bath temperature at 119°–125° C. to give a 61.1% solution of copolymer in toluene. Five-tenth percent of this copolymer in an oil test blend dispersed 0.4% asphaltenes at 150° C.

*Example 30*

In the same manner as described in Example 25 there were copolymerized 15.0 parts of lauryl-myristyl methacrylate and 5.0 parts of diethylphosphonoethyl methacrylate in 21.0 parts of toluene with 0.26 part of a tert-butyl perbenzoate solution (95% active ingredient) during 6.5 hours with the bath temperature at 111°–120° C. to give a 42.0% solution of copolymer in toluene. Five-tenth percent of this copolymer in an oil test blend dispersed 0.4% asphaltenes at 150° C.

*Example 31*

A mixture was prepared from 15 parts of vinyl laurate, 1 part of toluene, 1.4 parts of a 50% diisopropylbenzene hydroperoxide solution in alcohol and ketone as furnished commercially, and 1.4 parts of a 5% solution of diisobutylphenoxyethoxyethylbenzyldimethylammonium chloride in n-hexanol. This mixture was charged to a reaction vessel flushed with nitrogen and heated to 100° C. by means of an oil bath. At two hours, the vinyl laurate had polymerized to the extent of 81%. A separate monomeric mixture was made up consisting of 5 parts of diethylphosphonoethyl methacrylate, 0.5 part of toluene, 0.7 part of a 50% diisopropylbenzene hydroperoxide solution and 0.7 part of a 5% solution of diisobutylphenoxyethoxyethyldimethylbenzylammonium chloride in n-hexanol. This monomeric mixture was charged to the reaction vessel containing the polyvinyl laurate and monomer beginning at 2 hours. At 160, 200, 240, 280, and 320 minutes respectively, 0.7 part of 50% solution of diisopropylbenzene hydroperoxide and 0.7 part of the 5% n-hexanol solution of diisobutylphenoxyethoxyethyldimethylbenzylammonium chloride in 1 part of toluene were added. At 360 minutes heating and stirring were stopped. The product was a 44.9% solution of copolymer in toluene. At 100° F. a toluene solution adjusted to 30% copolymer gave a viscosity of 15 centistokes.

A blend in oil of 0.063% of this copolymer dispersed 0.4% of asphaltenes at 90° C.

*Example 32*

In the same manner as in the previous examples polymerization was started with 60 parts of di(cetyl-stearyl) itaconate and 15 parts of lauryl-myristyl methacrylate in toluene at 100°–105° C. After two hours of polymerization there was slowly added 25 parts of diethylphosphonoethyl methacrylate together with additional initiator (diisopropylbenzene hydroxide) and the quaternary ammonium salt. At six hours the yield of copolymer was 70% and the product was a 31.7% solution of copolymer. It had a viscosity of 410 cs. at 100° F. A 1% blend in oil readily dispersed 0.4% of asphaltenes at 90° C.

Copolymers of this invention provide improvements in the viscosity-temperature relationship of lubricants containing them. The extent of the improvement will depend in part upon the choice of comonomers and in part upon the type and size of copolymer formed. The optimum combination of monomers depends upon the particular liquid to be treated. For instance, for a heavy oil, it is generally desirable to use some relatively large hydrocarbon substituent together with somewhat smaller substituents. This principle can also be used for developing good pour point depressing action.

An effect peculiar to presence of phosphorus-containing groups is development of anti-wear properties. These properties can be somewhat further increased by the presence of some forms of sulfur. An estimate of anti-wear properties can be made with the aid of Shell Four-Ball Wear Tester, in which one ball is rotated at 75° C. under a determined load in a chuck against a pocket of three stationary balls with the contact surfaces submerged in the lubricant composition under test. Scars developed on the three balls are measured under a microscope in millimeters. In general, smaller scars indicate less wear.

Tests were made in a base oil (a 170 solvent extracted mid-continent neutral) which gave scar diameters of 0.62 mm. at 10 kg. load and 0.83 at 40 kg. load. This oil with 0.15% of tricresyl phosphate gave values of 0.40 and 0.78 respectively at these same loads.

A blend of base oil with 1% of a copolymer prepared from 80 parts of lauryl-myristyl methacrylate and 10 parts of delta-chlorobutyl methacrylate with catalyzed delayed addition of 10 parts of diethylphosphatoethyl methacrylate gave scars of 0.34 and 0.62 mm. respectively.

A blend of base oil with about 1% of a copolymer from 95 parts of poly(lauryl-myristyl methacrylate) and 5 parts of diethylphosphatoethyl methacrylate gave scars of 0.26 and 0.52 mm. respectively.

A blend of base oil with about 1% of a copolymer from 90 parts of a copolymer from 90 parts of lauryl-myristyl methacrylate and 5 parts of methoxypolyethoxyethyl methacrylate having about 30 ether groups with 5 parts of diethylphosphatoethyl methacrylate supplied to the polymerizing mixture gave scars of 0.23 and 0.53 mm. respectively.

A blend of base oil and about 1% of a copolymer from 75 parts of lauryl-myristyl methacrylate and 10 parts of ethylsulfinylethyl methacrylate with 1.5 parts of diethyl phosphatoethyl methacrylate and 7.5 parts of diethylphosphonoethyl methacrylate gave scars of 0.23 and 0.40 respectively.

A blend of base oil and about 2% of copolymer formed as described above from 80 parts of lauryl-myristyl methacrylate and 20 parts of diethylphosphonothionoethyl methacrylate gave scars averaging 0.28 and 0.50 mm. respectively.

A blend of base oil and about 1% of a copolymer from 90.6 parts of lauryl-myristyl methacrylate and 9.4 parts of diethylphosphitoethyl methacrylate as made by the process of this invention gave scars of 0.26 and 0.54 mm. respectively.

A blend was prepared in base oil with 0.5% of sulfurized sperm oil and 1% of a copolymer based on 60 parts of cetyl-stearyl methacrylate, 20 parts of lauryl methacrylate, 10 parts of butyl methacrylate, and 10 parts of dibutylphosphonomethyl methacrylate. It was tested only under a load of 40 kg. and gave a scar of 0.43 mm. diameter.

Improvements in viscosity-temperature relationships are regularly obtained although the extend varies with the choice of comonomers for forming the copolymers and their molecular size. Many of the copolymers also provide depression of pour points of lubricants. This action is more readily attained with copolymers of this invention than, for example, wtih copolymers based only on alkyl esters of unsaturated acids. Here the presence of groups as large as dodecyl together with the phosphorus-containing groups gives pour depressing action. Some typical data on viscosity index and pour point depression follow.

A copolymer was prepared starting with 80 parts of lauryl-myristyl methacrylate and a hydroperoxide-quaternary ammonium salt initiator and adding 20 parts of diethylphosphonoethyl methacrylate. A 2% solution of this copolymer was made in oil identified as PL–1651 oil. This solution had viscosities of 6.58 cs. at 100° F. and 42.67 cs. at 210° F., giving a viscosity index of 121. The A.S.T.M. pour point of this solution was −15° F. The PL–1651 oil itself gives viscosities of 5.38 cs. at 100° F. and 34.15 cs. at 210° F., corresponding to a viscosity index of 100. It has a pour point of 0° F.

Another copolymer was similarly made starting from 75 parts of lauryl-myristyl methacrylate and 10 parts of ethylsulfinylethyl methacrylate with hydroperoxide-quaternary ammonium salt initiator and adding 15 parts of diethylphosphonoethyl methacrylate. A solution of 2.67% of this copolymer in PL–1651 oil had viscosities of 7.94 cs. at 100° F. and 42.67 cs. at 210° F., corresponding to a viscosity index of 146. This solution had a pour point (A.S.T.M.) of −15° F.

A copolymer similarly prepared from 75 parts of lauryl-myristyl methacrylate, 10 parts of ethylsulfinylethyl methacrylate, and 15 parts of diethylphosphatoethyl methacrylate was dissolved at 2.83% in PL–1651 oil. Viscosities of this solution were 7.47 cs. at 100° F. and 41.93 cs. at 210° F., giving a viscosity index of 140. The pour point was −25° F.

Another copolymer was made in the same way with a hydroperoxide-quaternary ammonium salt initiator starting with 75 parts of lauryl-myristyl methacrylate and adding 25 parts of diethylphosphatomethyl methacrylate. A 2.36% solution of this copolymer in PL–1651 had viscosities of 8.36 cs. at 100° F. and 47.14 cs. at 210° F., corresponding to a viscosity index of 142.

Evaluations were also made in an SAE–30 oil having viscosities of 12.47 cs. at 100° F. and 128 cs. at 210° F., corresponding to a viscosity index of 96. This oil contained an anti-oxidant and a heavy duty detergent, a basic dioctylphenol-sulfide.

A copolymer was prepared starting with 75 parts of lauryl-myristyl methacrylate with tert-butyl hydroperoxide as initiator and adding 25 parts of diethylphosphonoethyl methacrylate. A 2.5% solution of this copolymer in the above oil had viscosities of 8.66 cs. at 100° F. and 196.4 cs. at 210° F., giving a viscosity of 111.

As has been indicated above, the copolymers of this invention may be used in conjunction with other additives for lubricating compositions. These includes anti-oxidants, stabilizers, high temperature detergents, other low temperature dispersants, other pour point depressants, other viscosity index improvers, anti-squawk agents, extreme pressure agents, foam suppressors, and corrosion initiators, anti-wear agents, oiliness agents, and other types of oil additives. These include such materials as 4,4'-methylenebis-2,6-di-tert-butylphenol, trialkylphenols, as 2,6 - di - tert - butylcresol, tris(dimethylaminomethyl) phenol, phenothiazine, phenyl-α-naphthylamine, phenyl-β-naphthylamine, zinc dialkyl diethiaphosphates, zinc dicyclohexyl dithiophosphate, zinc diphenyl dithiophosphates, barium dialkyl dithiophosphate, nickel dialkyl dithiophosphate, calcium, strontium, or barium petroleum sulfonates, including both normal and basic, alkaline earth alkylbenzene sulfonates and alkylnaphthalenes, alkaline earth alkylphenates, particularly with excess alkaline earth and such basic phenates which have been carbonated, alkaline earth metal alkylsalicylates, normal or basic aluminum naphthenates, calcium phenylstearates, alkaline earth metal salts of diphenol sulfides, alkaline earth salts of alkylated phenols and alkylphenol-formaldehyde condensates, tricresyl phosphate, chloroalkyl phosphates and phosphites, silicones, such as polymethylsiloxanes, octylphenoxyethoxyethoxyethanol, nonylphenoxypolyethoxyethanol, alkenylsuccinic anhydride, sulfurized sperm oil, sulfurized terpenes, polyisobutylene, copolymers of cetyl, lauryl, and butylmethacrylates, copolymers of dilauryl fumarate and vinyl acetate, copolymers of dodecyl acrylate and N-vinyl-2-pyrrolidinone, copolymers of lauryl-myristyl methacrylate and 2-methyl-5-vinylpyridine, copolymers of cetyl methacrylate and alkoxypolyethoxylmethacrylate, or tert-alkylamines, these being typical of the various types of additives.

It is standard practice to use various types of additives in a lubricating oil. Typical formulations follow: (A) 2% of a copolymer from 90 parts of lauryl-myristyl methacrylate and 10 parts of diethylphosphatoethyl methacrylate, 1% of a copolymer of 90% of stearyl methacrylate, lauryl methacrylate, and butyl methacrylate with 10% of N-vinyl-2-pyrrolidinone, 2% of a basic calcium petroleum sulfonate, and 1% of zinc dialkyl dithiophosphate, all dissolved in a neutral oil; (B) the composition of A to which is added 0.2% of octylphenoxyethoxyethoxyethanol; (C) a lubricating oil containing 3% of copolymer from 75 parts of mixed alkyl methacrylate having 12 to 18 carbon atoms in the alkyl portion and 25 parts of dipropylphosphonomethyl methacrylate, 3% of a basic calcium phenate based on a diisobutylphenol-formaldehyde condensate, and 1% of 4,4'-methylenebis-2,6-di-tert-butylphenol; (D) a lubricating oil containing 1.75% of a copolymer of stearyl, lauryl, and methyl methacrylate and dimethylaminoethyl acrylate, 1.5% of a copolymer of 75 parts of long-chained alkyl methacrylates, 10 parts of butylsulfinylethyl acrylate, and 15 parts of dipropylphosphatoethyl methacrylate, and 1% of zinc dialkyl dithiophosphate; (E) a lubricating oil containing 1.5% of a copolymer from long-chained alkyl acrylates and 2-methyl-5-vinylpyridine, 2% of a copolymer from mixed alkyl methacrylates, styrene, and diethylphosphatopropyl methacrylate, and 1% of methylenebis-2,6-di-tert-butylphenol; (F) oil containing 2% of a copolymer of long-chained alkyl methacrylates, methyl acrylate, and diethylphosphatopropyl methacrylate (at 15%), 0.5% of a pour depressing copolymer of stearyl, lauryl, and octyl methacrylates, 1% of polyisobutylene, and 1% of zinc dialkyl dithiophosphite. To any of these compositions there may be added a trace of a polymethylsiloxane anti-foaming agent, usually in an amount from 0.0001 to 0.001%.

Lubricating oils include mineral oils varying in viscosity from spindle oils to reciprocating aircraft engine oils. Oils for sparking combustion and compression ignition engines are sold under grades commonly identified as S.A.E. 10 to 50 and the like including so-called "multiple branded" oils, made possible through use of polymers including those of this invention. Engine or motor oils are of considerable importance for application of copolymers of this invention, but they may be used in other types of lubricants, as in automatic transmission fluids, hydraulic fluids, gear oils, and greases. They are also useful in synthetic lubricants, as has been shown.

There may be used from about 0.1% to 10% of one or more of the copolymers in a lubricating composition.

The copolymers of this invention also find use in combustible fluids. These fluids include fuel oils, jet fuels, and gasolines. Dispersing action is obtained in these fluids with about 0.001% to about 0.1% or more by weight of one or more of these copolymers.

Fuel oils comprise hydrocarbon distillates boiling from about the upper range of gasolines to light lubricating oils. They include fuels designated as kerosenes, furnace oil burner oils, and diesel fuels, and may include jet fuels. Jet fuels may include distillates which would be classified as gasolines.

These distillates may be straight-run or cracked oils or mixtures of such oils. In the storage and handling of fuel oils, there may be development of colors, sludges, and sediments which result in deposits on containers and screens and at orifices or other parts of equipment for handling, storing, and using these oils.

Benefits from the use of copolymers of this invention in fuel oils and gasolines are shown by such tests as the Cities Service test (Analytical Chemistry 24, 1959, (1952)) in which oil is subjected to oxidation at 250° F. and passed through a #1 filter paper. Time for filtering is measured. There is a marked reduction in this time when the fuel oil under test contains a copolymer of this invention.

Effective action of copolymers of this invention is also demonstrated by measurements of pressure with time when samples are heated at 500° F. and circulated through a filter with a pump. Oils which permit circulation for about 75 minutes and treated with one of these copolymers can be circulated for over 300 minutes before excessive pressures build up.

The beneficial effects are also demonstrable by the panel coker test.

I claim:

1. A process for preparing oil-soluble, dispersing copolymers which comprises (1) first polymerizing under the influence of a free radical polymerization initiator at least one polymerizable monovinylidene compound until 40% to about 90% thereof has polymerized, whereby a mixture of monomer and polymer is formed, said monomer being selected from at least one member of the class consisting of alkyl esters of acrylic, methacrylic, and itaconic acids, vinyl esters of alkanoic acids, and mixtures of said esters, the average size of alkyl group in said esters being sufficiently large to impart solubility of the copolymers in hydrocarbon oils and being at least eight carbon atoms, (2) then adding to said mixture at least one phosphorus-containing ester from the class consisting of compounds of the formulas (I) 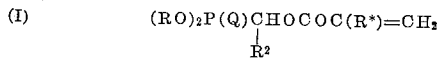

(II) $(RO)_2P(Q)OC_nH_{2n}OCOC(R^*)=CH_2$ (III) $(RO)_2POC_nH_{2n}OCOC(R^*)=CH_2$ and (IV) $(RO)_2P(S)SCOC(R^*)=CH_2$ the phosphorus-containing ester being about 3% to about 35% of the total weight of monomers used in said process, wherein R* represents a member of the class consisting of hydrogen and the methyl group,
    R represents an alkyl group of one to eight carbon atoms,
    $R^2$ represents a member of the class consisting of hydrogen and alkyl groups of one to seven carbon atoms,
    Q represents a member of the class consisting of oxygen and sulfur, and
    $n$ represents an integer of two to three, and (3) copolymerizing the resulting mixture under the influence of a free radical polymerization initiator, wherein said initiator is selected from the class consisting of azo and peroxidic catalyst.

2. A process for preparing oil-soluble dispersing copolymers which comprises (1) first polymerizing under the influence of a free radical polymerization initiator at least one polymerizable monovinylidene compound selected from at least one member of the class consisting of alkyl esters of acrylic, methacrylic, and itaconic acids, and mixtures of said esters, the average size of alkyl groups in said esters being sufficiently large to impart solubility in hydrocarbon oils and being at least eight carbon atoms, (2) mixing with the resulting polymer, said polymer being in admixture with a monovinylidene compound in a proportion of 40% to 90% of the combined weight of polymer and said monovinylidene compound, at least one phosphorus-containing ester from the class consisting of compounds of the formulas (I)     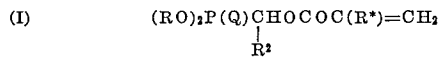

(II)     

(III)    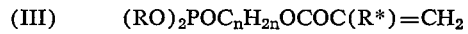

and (IV)    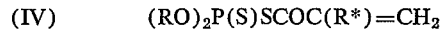

the phosphorus-containing ester being about 3% to about 35% of the total weight of monomers used in said process, wherein R* represents a member of the class consisting of hydrogen and the methyl group,
    R represents an alkyl group of one to eight carbon atoms,
    $R^2$ represents a member of the class consisting of hydrogen and alkyl groups of one to seven carbon atoms,
    Q represents a member of the class consisting of oxygen and sulfur, and
    $n$ represents an integer of two to three, and (3) copolymerizing the resulting mixture under the influence of a free radical polymerization initiator, wherein said initiator is selected from the class consisting of azo and peroxidic catalyst.

3. A process for preparing oil-soluble dispersing copolymers which comprises (1) first polymerizing under the influence of a free radical polymerization initiator at least one polymerizable monovinylidene compound until 40% to about 90% thereof has polymerized, whereby a mixture of monomer and polymer is formed, said monomer being selected from at least one member of the class consisting of alkyl esters of acrylic, methacrylic, and itaconic acids, vinyl esters of alkanoic acids, and mixtures of said esters, the average size of alkyl group in said esters being sufficiently large to impart solubility of final copolymer in hydrocarbon oils and being at least eight carbon atoms, together with a minor proportion of at least one member of the class consisting of acrylic acid, methacrylic acid, itaconic acid, maleic anhydride, maleic half esters, maleic half amides, dialkyl maleates, dialkyl fumarates, vinyl alkyl ethers, acrylonitrile, methacrylonitrile, and acrylamides, (2) then adding to said mixture at least one phosphorus-containing ester from the class consisting of compounds of the formulas (I)     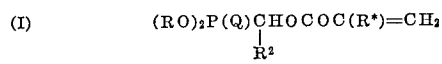

(II)     

(III)    

and (IV)    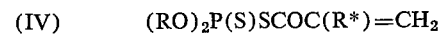

the phosphorus-containing ester being about 3% to about 35% of the total weight of monomers used in said process, wherein R* represents a member of the class consisting of hydrogen and the methyl group,
    R represents an alkyl group of one to eight carbon atoms,
    $R^2$ represents a member of the class consisting of hydrogen and alkyl groups of one to seven carbon atoms,
    Q represents a member of the class consisting of oxygen and sulfur, and
    $n$ represents an integer of two to three, and (3) copolymerizing the resulting mixture under the influence of a free radical polymerization initiator, wherein said initiator is selected from the class consisting of azo and peroxidic catalyst.

4. A process for preparing oil-soluble dispersing copolymers which comprises (1) first polymerizing under the influence of a free radical polymerization initiator a mixture of starting monomers comprising a major proportion of at least one alkyl methacrylate, the alkyl moiety whereof being sufficiently large to impart to the final copolymer solubility in hydrocarbon oils, and a minor proportion of at least one other polymerizable monovinylidene compound whereby base polymer is formed, (2) then mixing with the resulting base polymer at least one phosphorus-containing ester from the class consisting of compounds of the formulas (I)     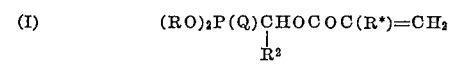

(II)     

(III)    

and (IV)    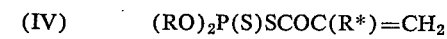

the phosphorus-containing ester being about 3% to about 35% of the total weight of monomer used in said process, wherein R* represents a member of the class consisting of hydrogen and the methyl group,
    R represents an alkyl group of one to eight carbon atoms,
    $R^2$ represents a member of the class consisting of hydrogen and alkyl groups of one to seven carbon atoms,
    Q represents a member of the class consisting of oxygen and sulfur, and
    $n$ represents an integer of two to three, the said resulting base polymer being 40% to 90% of the said starting monomers, and (3) copolymerizing under the influence of a free radical polymerization initiator said phosphorus-containing ester with a mixture of said polymer and starting monomers, wherein said initiator is selected from the class consisting of azo and peroxidic catalyst.

5. A process for preparing oil-soluble dispersing copolymers which comprises (1) first polymerizing under the influence of a free radical polymerization initiator at least one alkyl methacrylate as starting monomer, the alkyl moiety thereof being sufficiently large to impart to the final copolymer solubility in hydrocarbon liquids, whereby base polymer is formed, said base polymer amounting to 40% to 90% of the said starting monomer, (2) then mixing with the base polymer at least one phosphorus-containing ester from the class consisting of compounds of the formulas

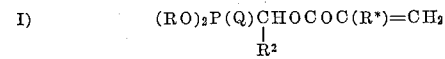

(II)    $(RO)_2P(Q)OC_nH_{2n}OCOC(R^*)=CH_2$ (III)   $(RO)_2POC_nH_{2n}OCOC(R^*)=CH_2$ and (IV)    $(RO)_2P(S)SCOC(R^*)=CH_2$ the phosphorus-containing ester being about 3% to about 35% of the total weight of monomers used in said process, R* representing a member of the class consisting of hydrogen and the methyl group, R representing an alkyl group of one to eight carbon atoms, R² representing a member of the class consisting of hydrogen and alkyl groups of one to seven carbon atoms, Q representing a member of the class consisting of oxygen and sulfur, and n representing an integer of two to three, and (3) polymerizing under the inuence of a free radical polymerization initiator the mixture of base polymer, alkyl methacrylate, and phosphorus-containing ester, wherein said initiator is selected from the class consisting of azo and peroxidic catalyst.

6. A process according to claim 5 in which as starting monomers there is used a mixture of alkyl methacrylates having 12 to 18 carbon atoms in the alkyl moiety thereof.

7. A process according to claim 5 in which as starting monomers there is used a mixture of alkyl methacrylates having an average of at least eight carbon atoms in the alkyl moiety and comprising at least one alkyl methacrylate with 12 to 18 carbon atoms in the alkyl portion and at least one alkyl methacrylate with 1 to 8 carbon atoms in the alkyl portion of the methacrylates.

8. A process according to claim 5 in which the free radical polymerization initiator used comprises a hydroperoxide and a quaternary ammonium salt.

9. A process for preparing oil-soluble dispersing copolymers whiuh comprises (1) first polymerizing under the influence of a free radical polymerization initiator at least one alkyl acrylate as starting monomer, the alkyl moiety thereof being sufficiently large to impart to the final copolymer solubility in hydrocarbon liquids, whereby base polymer is formed, said base polymer amounting to 40% to 90% of the said starting monomer, (2) then mixing with the base polymer at least one phosphorus-containing ester from the class consisting of compounds of the formulas

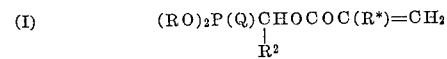

(II)    $(RO)_2P(Q)OC_nH_{2n}OCOC(R^*)=CH_2$ (III)   $(RO)_2POC_nH_{2n}OCOC(R^*)=CH_2$ and (IV)    $(RO)_2P(S)SCOC(R^*)=CH_2$ the phosphorus-containing ester being about 3% to about 35% of the total weight of monomers used in said process, R* representing a member of the class consisting of hydrogen and the methyl group, R representing an alkyl group of one to eight carbon atoms, R² representing a member of the class consisting of hydrogen and alkyl groups of one to seven carbon atoms, Q representing a member of the class consisting of oxygen and sulfur, and n representing an integer of two to three, and (3) polymerizing under the influence of a free radical polymerization initiator the mixture of base polymer, alkyl acrylate, and phosphorus-containing ester, wherein said initiator is selected from the class consisting of azo and peroxidic catalyst.

10. A process according to claim 9 in which the free radical polymerization initiator used comprises a hydroperoxide and a quaternary ammonium salt.

11. A process for preparing oil-soluble copolymers which comprises (1) first copolymerizing under the influence of a free radical polymerization initiator a mixture of starting monomers comprising a major proportion of alkyl methacrylates with 12 to 18 carbon atoms in the alkyl moiety thereof and in minor proportion an alkyl methacrylate with 1 to 4 carbon atoms in the alkyl moiety thereof, the average size of alkyl group being sufficient to impart to the final copolymer solubility in hydrocarbon liquids, whereby base polymer is formed, said base polymer amounting to 40% to 90% of the starting monomers, (2) then mixing with the base polymer diethylphosphatoethyl methacrylate in an amount of 15% to 30% of the total weight of monomers used in said process and (3) polymerizing under the influence of a free radical polymerization initiator the mixture of base polymer, alkyl methacrylates, and diethylphosphatoethyl methacrylate, wherein said initiator is selected from the class consisting of azo and peroxidic catalyst.

12. A process for preparing oil-soluble copolymers which comprises (1) first copolymerizing under the influence of a free radical polymerization initiator a mixture of starting monomers comprising in major proportion alkyl methacrylates with 12 to 18 carbon atoms in the alkyl moiety thereof and in minor proportion an alkyl methacrylate with 1 to 4 carbon atoms in the alkyl moiety thereof, the average size of alkyl group being sufficient to impart to the final copolymer solubility in hydrocarbon liquids, whereby base polymer is formed, said base polymer amounting to 40% to 90% of the starting monomers, (2) then mixing with the base polymer diethylphosphonoethyl methacrylate in an amount of 15% to 30% of the total weight of monomers used in said process, and (3) polymerizing under the influence of a free radical polymerization initiator the mixture of base polymer, alkyl methacrylates, and diethylphosphonoethyl methacrylate, wherein said initiator is selected from the class consisting of azo and peroxidic catalyst.

13. A process for preparing oil-soluble copolymers which comprises (1) first copolymerizing under the influence of a free radical polymerization initiator a mixture of starting monomers comprising in major proportion alkyl methacrylates with 12 to 18 carbon atoms in the alkyl moiety thereof and in minor proportion ethylsulfinylethyl methacrylate, the proportion of said methacrylates imparting to the final copolymer solubility in hydrocarbon liquids, whereby base polymer is formed, said base polymer amounting to 40% to 90% of the starting monomers, (2) then mixing with the base polymer diethylphosphatoethyl methacrylate in an amount of 15% to 30% of the total weight of monomers used in said process, and (3) polymerizing under the influence of a free radical polymerization initiator the mixture of base polymer, starting monomers, and diethylphosphatoethyl methacrylate, wherein said initiator is selected from the class consisting of azo and peroxidic catalyst.

14. A process for preparing oil-soluble copolymers which comprises (1) first copolymerizing under the influence of a free radical polymerization initiator a mixture of starting monomers comprising in major proportion alkyl methacrylates with 12 to 18 carbon atoms in the alkyl moiety thereof and in minor proportion ethylsulfinylethyl methacrylate, the proportions of said methacrylates imparting to the final copolymer solubility in hydrocarbon liquids, whereby base polymer is formed, said base polymer amounting to 40% to 90% of the starting monomers, (2) then mixing with the base polymer 1-diethylphosphonoethyl methacrylate in an amount of 15% to 30% of the total weight of monomers used in said process, and (3) polymerizing under the influence of a free radical polymerization initiator the mixture of base polymer, starting monomers, and 1-diethylphosphonoethyl methacrylate, wherein said initiator is selected from the class consisting of azo and peroxidic catalyst.

15. A copolymer of the process of claim 1.
16. A copolymer of the process of claim 3.

References Cited by the Examiner

UNITED STATES PATENTS

| | | | |
|---|---|---|---|
| 2,478,441 | 8/1949 | Wiley | 260—85.7 |
| 2,694,684 | 11/1954 | Rogers et al. | 252—49.8 |
| 2,863,834 | 12/1958 | Buckmann | 252—32.5 |
| 3,005,006 | 10/1961 | Millikan | 260—461 |
| 3,030,347 | 4/1962 | O'Brien et al. | 260—49.8 |
| 3,088,931 | 5/1963 | Scanley et al. | 260—885 |
| 3,089,832 | 5/1963 | Black et al. | 260—885 |
| 3,102,863 | 9/1963 | Herbert et al. | 260—79.7 |
| 3,105,819 | 10/1963 | Anderson | 252—49.8 |

MURRAY TILLMAN, *Primary Examiner.*

JULIUS GREEWALD, *Examiner.*

J. R. SEILER, J. T. GOOLKASIAN,
*Assistant Examiners.*